US009024593B2

(12) United States Patent
Keller et al.

(10) Patent No.: US 9,024,593 B2
(45) Date of Patent: May 5, 2015

(54) POWER SUPPLY UNIT AND A METHOD FOR OPERATING THE SAME

(75) Inventors: Thomas Keller, Freising (DE); Joerg E. Goller, Tiefenbach (DE); Erich J. Bayer, Thonhausen (DE)

(73) Assignee: Texas Instruments Deutschland GmbH, Freising (DE)

( * ) Notice: Subject to any disclaimer, the term of this patent is extended or adjusted under 35 U.S.C. 154(b) by 414 days.

(21) Appl. No.: 13/447,018

(22) Filed: Apr. 13, 2012

(65) Prior Publication Data

US 2012/0262437 A1    Oct. 18, 2012

(30) Foreign Application Priority Data

Apr. 14, 2011    (DE) .......................... 10 2011 017 082

(51) Int. Cl.
| | | |
|---|---|---|
| *H02M 3/156* | (2006.01) | |
| *H02M 1/00* | (2006.01) | |
| *G05F 1/59* | (2006.01) | |
| *H02M 3/158* | (2006.01) | |
| *H02M 7/48* | (2006.01) | |

(52) U.S. Cl.
CPC .......... *H02M 7/48* (2013.01); *H02M 2001/007* (2013.01)

(58) Field of Classification Search
CPC .......... H02M 3/156; H02M 2001/007; H02M 3/1588; G05F 1/59
USPC .................................. 323/222, 266, 269, 271
See application file for complete search history.

(56) References Cited

U.S. PATENT DOCUMENTS

| | | | | |
|---|---|---|---|---|
| 5,741,303 | A  * | 4/1998  | Kroll et al. ........................ | 607/5 |
| 6,462,485 | B1 * | 10/2002 | Kimball ...................... | 315/169.3 |
| 6,504,208 | B2 * | 1/2003  | Bosco et al. .................. | 257/341 |
| 7,151,344 | B2 * | 12/2006 | Wood .......................... | 315/169.3 |
| 7,999,521 | B2 * | 8/2011  | Bayer et al. ................... | 323/267 |
| 2009/0153064 | A1* | 6/2009 | Fryer ......................... | 315/169.3 |
| 2009/0167264 | A1* | 7/2009 | Bayer et al. ................. | 323/267 |
| 2009/0267928 | A1* | 10/2009 | Fryer et al. ................... | 345/211 |
| 2010/0291445 | A1* | 11/2010 | Igarashi ....................... | 429/428 |
| 2011/0089843 | A1* | 4/2011  | Krapp et al. .................. | 315/192 |

FOREIGN PATENT DOCUMENTS

| | | | | | |
|---|---|---|---|---|---|
| GB | 2 372 647 | A | * | 8/2002 | ............. H05B 33/08 |
| GB | 2 405 270 | A | * | 2/2005 | ............. H05B 33/08 |
| GB | 2 405 270 | B | * | 4/2007 | ............. H05B 33/08 |

* cited by examiner

*Primary Examiner* — Timothy J Dole
*Assistant Examiner* — Sisay G Tiku
(74) *Attorney, Agent, or Firm* — William B. Kempler; Frank D. Cimino (57) ABSTRACT

A power supply unit includes a boost converter having an input node and output node. The output node is coupled to a high-side of an H-bridge that is for supplying power to a capacitive load that is coupled to a first node and to a second node of the H-bridge. A first diode is coupled in forward direction between the first node of the H-bridge and the input node of the boost converter. A second diode is coupled in forward direction between the second node of the H-bridge and the input node of the boost converter.

12 Claims, 7 Drawing Sheets

POWER SUPPLY UNIT AND A METHOD FOR OPERATING THE SAME

CROSS-REFERENCE TO RELATED APPLICATIONS

This patent application claims priority from German Patent Application No. 10 2011 017 082.0, filed Apr. 14, 2011, which is incorporated herein by reference in its entirety.

FIELD OF THE INVENTION

The invention relates to a power supply unit and to a method for operating a power supply unit comprising a boost converter and an H-bridge.

BACKGROUND OF THE INVENTION

Power supply units for driving a mainly capacitive load, e.g., an LCD display, often perform periodic charging and discharging of the capacitive load. In battery-driven applications, the power supply unit may comprise a boost converter for supplying an H-bridge.

Figure 1:
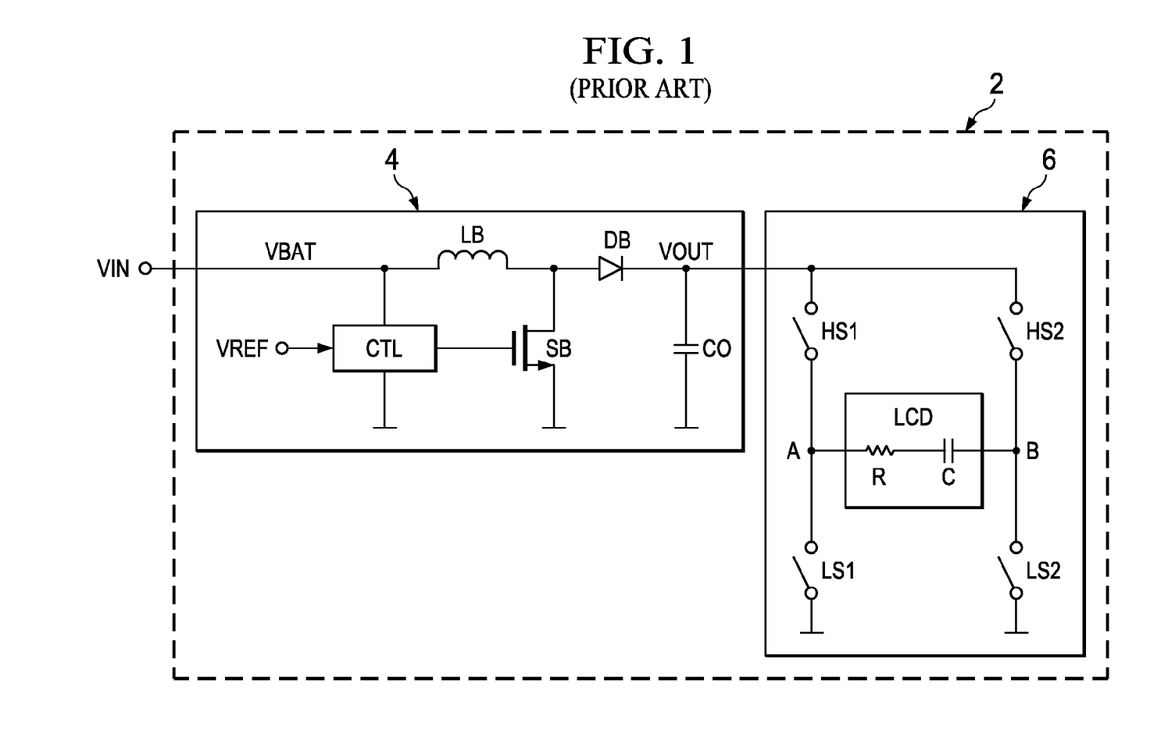
FIG. 1 is a simplified circuit diagram for a power supply unit according to the prior art.

FIG. 1 is an exemplary power supply unit 2 comprising a boost converter 4 and an H-bridge 6. The input terminal VIN is supplied with a power supply voltage VBAT, e.g., from a battery. The typical boost converter 4 configuration comprises an inductance LB that is coupled to the power input node VIN and further to a switch SB that is controlled by a suitable control unit CTL. Further, the boost converter 4 comprises a diode DB that is coupled in forward direction between a source of the switch SB and the inductance LB, respectively, and an output capacitor CO. The anode of the diode DB is coupled to the switch SB and to the inductance LB while the cathode of the diode DB is coupled to the output capacitor CO. The boost converter 4 provides an output voltage VOUT to the high-side of the H-bridge 6. The H-bridge 6 comprises high-side switches HS1 and HS2 that are coupled to the supply voltage VOUT and to a first node A and to a second node B, respectively. Further, the H-bridge 6 comprises low-side switches LS1 and LS2 that are coupled to the first and second node A and B, respectively. The respective opposite side of the low-side switches LS1 and LS2 is coupled to ground. Between the first node A and the second node B there is an exemplary capacitive load, namely an LCD-display (LCD). The LCD is schematically represented by an Resistance R and a load capacity C.

Charging of the LCD is performed by exemplarily applying an output voltage VOUT of e.g., 12 V, via the first high-side switch HS1 and the second low-side switch LS2 to the load capacitance C. Opposite charge states of the load capacitance C may be realized by crosswise activation of the respective high-side and low-side switches. For discharging the load capacitance C, the H-bridge 6 is set to a state where both high-side switches HS1, HS2 are open and both low-side switches LS1, LS2 are closed.

This scheme is usually applied to ensure proper operation of an LCD display. However, during the discharging steps, the energy/charge that is stored in the load capacitance C is lost. This results in a low efficiency of this driving scheme. Especially for battery-driven applications, this is not desirable.

Within the context of this specification, a closed switch or switch that is in a closed state is a conductive switch while an opened switch or switch in an opened state is a non-conductive switch.

SUMMARY OF THE INVENTION

It is a general object of the invention to provide a power supply unit and a method for operating a power supply unit that is improved with respect to energy consumption when driving a capacitive load.

In one aspect of the invention, a power supply unit comprising a boost converter and an H-bridge is provided. The boost converter has an input node and output node, wherein the output node of the boost converter is coupled to a high-side of the H-bridge that supplies power to a capacitive load. The capacitive load is coupled to a first node and to a second node of the H-bridge. A first diode is coupled in forward direction between the first node of the H-bridge and the input node of the boost converter. In other words, the anode of the first diode is coupled to the first node of the H-bridge and the cathode of the first diode is coupled to the input node of the boost converter. A second diode is coupled in forward direction between the second node of the H-bridge and the input node of the boost converter. In other words, the anode of the second diode is coupled to the second node of the H-bridge and the cathode of the second diode is coupled to the input node of the boost converter.

Further, at least a part of the charge that is typically lost during the discharge step of the load capacitance may be recovered by the power supply unit according to aspects of the invention. The charge may be pumped back into the output capacitor of the boost converter during the discharge step of the load capacitor.

In one aspect of the invention, a third diode is coupled in forward direction between a power source and the input node of the boost-converter. The anode of the third diode is coupled to the power source and the cathode of the third diode is coupled to the input node of the boost-converter. Further, the third diode avoids that charge from the capacitive load flowing back to the power supply.

According to another aspect of the invention, a low-side of the H-bridge is coupled to the power supply node. The power supply unit according to this aspect allows recovering more charge from the load capacitor during the discharging step. This is because the load capacitance is discharged as long as the respective node of the H-bridge that is coupled to the input node of the boost converter has a higher potential, i.e., voltage level than the input node. By raising the level of the opposite side of the load capacitance to the level of the input node, nearly the complete charge of the capacitor may be recovered.

In an embodiment of the invention, the power supply unit further comprises a first switch and a second switch. The first switch is coupled between a power input node of the power supply unit and the first node of the H-bridge. The second switch is coupled between the power input node of the power supply unit and the second node of the H-bridge. The first and second node of the H-bridge may be set to the voltage level of the power source during a discharge step. This allows a nearly complete recovery of the charge of the load capacitance. If the low-side of the H-bridge is coupled to the supply voltage, the boost converter has to apply an increased output voltage in order to provide the same voltage across the load capacitance because the first or second node of the H-bridge is set to the voltage level of the power supply. According to the above mentioned embodiment, the boost converter does not have to apply an increased output voltage and the charge of the load capacitance may be completely recovered.

In another aspect of the invention, the power supply unit further comprises a third switch and a fourth switch. The third switch is coupled between the second node of the H-bridge and the input node of the boost converter. The fourth switch is coupled between the first node of the H-bridge and the input node of the boost converter.

In the power supply unit according to the aspects of the invention, it is preferred if the charge pump is activated during the step of discharging only. Further, the power supply unit comprising the third and the fourth switch allows a continuous operation of the charge pump. This is especially preferred if the charge pump is shared among a plurality of H-bridges.

According to another aspect of the invention, a method for operating a power supply unit is provided. The power supply unit comprises a boost converter and an H-bridge. The boost converter has an input node and an output node, wherein the output node is coupled to a high-side of the H-bridge. The H-bridge is for supplying power to a capacitive load that is coupled to a first node and to a second node of the H-bridge. A first diode is coupled in forward direction between the first node of the H-bridge and the input node of the boost converter which means that the anode of the diode is coupled to the first node of the H-bridge and the cathode is coupled to the input node of the boost converter. A second diode is coupled in forward direction between the second node of the H-bridge and the input node of the boost converter. In other words, the anode of the second diode is coupled to the second node of the H-bridge and the cathode is coupled to the input node of the boost converter.

A third diode may be coupled in forward direction between a power source and the input node of the boost converter. The anode of the third diode is coupled to the power source and cathode of the third diode is coupled to the input node of the boost converter.

The capacitive load may be charged to a first load state by closing a first high-side switch and by closing a second low-side switch of the H-bridge. The capacitive load is discharged through the first diode, the second low-side switch of the H-bridge is closed. In other words, during discharging of the capacitive load, the remaining switches, namely the first and second high-side switch and the first low-side switch of the H-bridge are open.

Within the context of this specification, a conductive state of a switch is referred to as a closed state while a non-conductive state of the switch is referred to as an open state.

Further, the method according to the aspects of the invention allows recovering at least a part of the charge that is stored in the load capacitance. The charge may be pumped back into the boost converter.

According to further aspects of the invention, the capacitive load may be charged to a second load state by closing a second high-side switch of the H-bridge and by closing a first low-side switch of the H-bridge. This second load state provides an oppositely charged capacitive load when compared to the first load state. For discharging the capacitive load, the first low-side switch of the H-bridge is closed only. Further, charge may be recovered during a discharge step that follows a charging step resulting in the first load state and charge may be recovered during a discharge step that follows a reverse charging step resulting in the second load state.

According to another aspect of the invention, a method for operating a power supply unit further comprising a first switch and second switch is provided. The first switch is coupled between the power input node of the power supply unit and the first node of the H-bridge. The second switch is coupled between the power input node of the power supply unit and the second node of the H-bridge. For charging the capacitive load to an exemplary first load state, a first high-side switch and a second low-side switch of the H-bridge may be closed. For discharging the capacitive load the second switch is closed while the first high-side switch and the second low-side switch are opened. In other words, the capacitive load is charged as already known from the above-mentioned aspects of the invention. However, discharging of the capacitive load is performed by opening all switches of the H-bridge, and by closing the second switch only.

According to another aspect of the invention, the capacitive load is charged to a second load state by closing a second high-side and a first low-side switch of the H-bridge. Discharging of the capacitive load is performed by closing the first switch while all other switches are open. In other words, the reverse charging of the capacitive load that is coupled to the first node and the second node of the H-bridge is performed as already known from the above mentioned aspects of the invention. However, for discharging the capacitive load the first switch is closed only while the remaining switches, i.e., the first and second high-side switch and the first and second low-side switch are open.

Further, the method according to the aspects of the invention allows a complete or nearly complete recovery of the charge in the load capacitance when discharging the capacitive load for switching from the first load state to the second load state as well as during the discharge process for an opposite change from the second load state to the first load state.

BRIEF DESCRIPTION OF THE DRAWINGS

Further aspects of the invention will appear from the appending claims and from the following detailed description given with reference to the appending drawings:

DETAILED DESCRIPTION OF EXAMPLE EMBODIMENTS

Figure 2:
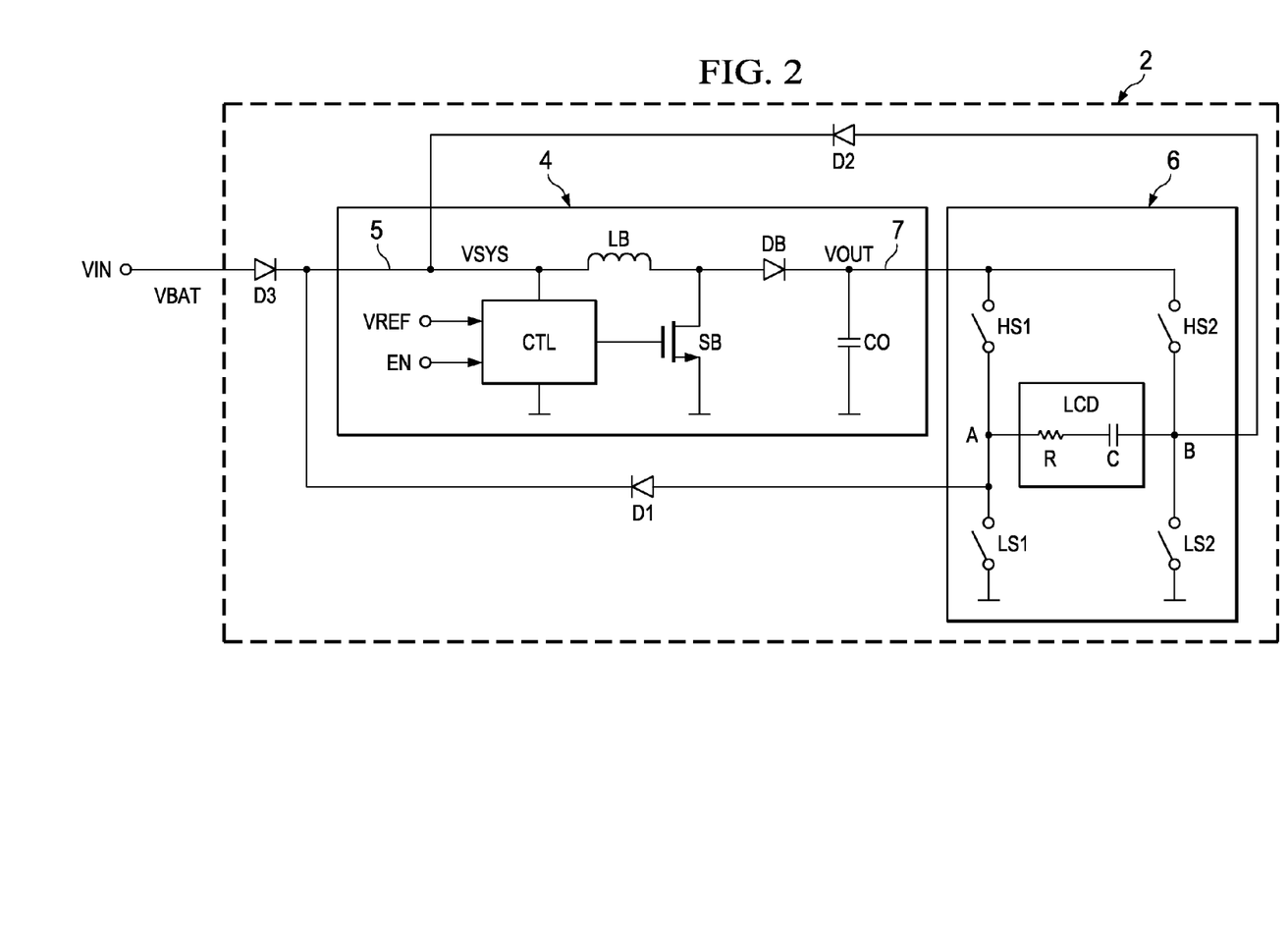
FIGS. 2 to 6 are simplified circuit diagrams for power supply units according to embodiments of the invention.

FIG. 2 is a simplified circuit diagram of a power supply unit 2 according to an embodiment of the invention. The power supply unit 2 comprises a boost converter 4 and an H-bridge 6. The power supply unit 2 comprises a power input node VIN that is supplied with a supply voltage VBAT from a power source, such as a battery. The power input node VIN is coupled to an input node/input line 5 of the boost converter 4 that is supplied with an input voltage VSYS. A difference between the supply voltage VBAT and the input voltage VSYS results from an optional third diode D3 that is coupled in forward direction between the power input node VIN and the input line 5 of the boost converter 4. The anode of the optional third diode D3 is coupled to the power input node VIN and the cathode of the of the third diode D3 is coupled to the input line 5 of the boost converter 4. The boost converter 4 comprises an inductance LB, a control unit CTL driving a switch SB, a diode DB and an output capacitor CO. The switch SB may be a CMOS transistor, e.g., a MOSFET, wherein the control unit CTL is driving the gate of this transistor. The drain of the switch SB is coupled to the inductance LB and further to the diode DB that is coupled in forward direction between the drain of the switch SB and the inductance LB, respectively, and the output capacitor CO. In other words, the anode of the diode DB is coupled to the Drain of the switch SB and the inductance LB while the cathode of the diode DB is coupled to the output capacitor CO.

The boost converter 4 supplies an output voltage VOUT to an output line 7 that is coupled to a high-side of the H-bridge 6. The H-bridge 6 comprises a first high-side switch HS1 and a second high-side switch HS2. Further, the H-bridge 6 comprises a first low-side switch LS1 and a second low-side switch LS2. Between the high-side switches HS1, HS2 and the low-side switches LS1, LS2, the H-bridge 6 comprises a first node A and a second node B. A capacitive load, preferably an LCD display (LCD), is coupled to the first node A of the H-bridge on the one hand and to the second node B of the H-bridge 6 on the other hand. The LCD is schematically illustrated by an RC circuit comprising a resistor R and a capacitance C. In the context of this specification, the capacitance C, i.e., the capacitive load of the LCD is also referred to as a "load capacitance".

The power supply unit 2 further comprises a first diode D1 that is coupled in forward direction between the first node A of the H-bridge 6 and the input line 5 of the boost converter 4. The anode of the first diode D1 is coupled to the first node A of the H-bridge 6 and the cathode of the first diode D1 is coupled to the input line 5 of the boost converter 4. A further and second diode D2 is coupled in forward direction between the second node B of the H-bridge 6 and the input line or node 5 of the boost converter 4. In other words, the anode of the second diode D2 is coupled to the second node B of the H-bridge 6 and cathode of the second diode D2 is coupled to the input line or node 5 of the boost converter 4. The third diode D3 is optional and blocks currents flowing back to the power input node VIN.

The two diodes D1 and D2 allow an improvement of the overall efficiency of the power supply unit 2 when compared to power supply units known in the prior art. During a discharge step of the capacitive load C, at least a part of the charge/energy that is stored in the capacitive load C may be recovered and pumped back to the output capacitor CO of the boost converter 4.

For charging the load capacitance C of the LCD; for example, the first high-side switch HS1 and the second low-side switch LS2 may be closed. Subsequently, there is a charge balancing between the output capacitor CO of the boost converter 4 and the load capacitance C. During this charging step, the boost converter 4 is preferably switched OFF. If the capacitance of the output capacitor CO is significantly greater than the capacitance of the load C (CO>>C), the drop in the output voltage VOUT that is caused by the charge balancing between the output capacitor CO and the load capacitance C is relatively small. In the context of this specification this balanced voltage is referred to as VOUT1.

In a subsequent discharge/charge recovery phase, both high-side switches, namely the first high-side switch HS1 and the second high-side switch HS2 are opened, while the low-side switch that was previously closed for charging the load capacitance, in this case the second low-side switch LS2, remains closed. Accordingly, the diodes D1, D2 and D3 will connect the highest potential node, i.e., either the first node A or second node B of the H-bridge 6 or the power input node VIN to the input line 5 of the boost converter 4. In the previous charging step, the load capacitance C was charged via the first high-side switch HS1 and the second low-side switch LS2. Accordingly, the highest potential is at the first node A of the H-bridge 6. By way of an example, this first node A of the H-bridge 6 is at 12 V. The second node B of the H-bridge 6 is grounded and the power input node VIN provides an exemplary supply voltage of VBAT=4 V. Accordingly, power is supplied to the power input line 5 of the boost converter 4 from the first node A of the H-bridge 6 via the first diode D1. This power supply continues until the potential of the first node A of the H-bridge 6 falls below the potential of the power supply node VIN. In other words, charge is supplied to the boost converter 4 from the load capacitance C as long as the voltage at the first node A of the H-bridge 6 is higher than the supply voltage VBAT at the power input node VIN. The boost converter 4 is pumping the charge/energy that is stored in the load capacitance C back into the output capacitor CO, until the potential of the first node A of the H-bridge 6 has dropped below the level of VBAT. From that point on, the boost converter 4 is supplied solely from the power supply node VIN.

For operation of the power supply unit 2, according to the embodiment in FIG. 2, it is preferable that the boost converter 4 is enabled only during the discharge phase of the load capacitance C. In other words, the boost converter 4 may be enabled, only if both high-side switches HS1, HS2 of the H-bridge 6 are open. Switching of the boost converter 4 may be performed by the enabling signal EN that is input to the control unit CTL.

Most of the charge that is stored in the load capacitance C is recovered during the discharge step. However, some charge will remain in the load capacitance C and is discharged during the next charge phase. This next charge phase may be started by closing the second high-side switch HS2 and the first low-side switch LS1. Accordingly, the load capacitance C may be charged to an opposite and second charge state.

Figure 3:
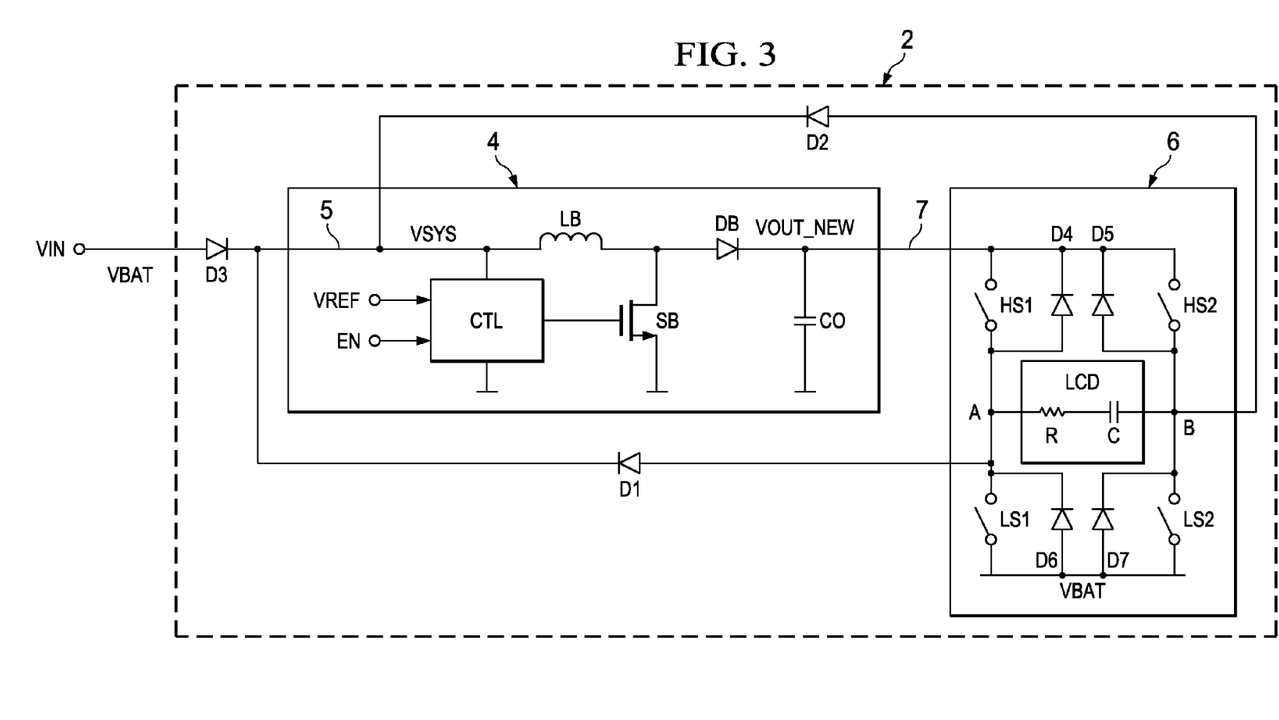

FIG. 3 is a further simplified circuit diagram illustrating a power supply unit 2 according to another embodiment of the invention. The power supply unit 2 is comparable to the power supply unit 2 in FIG. 2 aside from the feature that the two low-side switches LS1 and LS2 are not coupled to ground, but are however coupled to VBAT which is the level of the power input node VIN. If the switches HS1, HS2, LS1 and LS2 are implemented by MOS transistors, body diodes D4, D5, D6 and D7 would be present, as shown in FIG. 3.

For charging the load capacitance C, exemplarily, the first high-side switch HS1 and the second low-side switch LS2 of the H-bridge 6 may be closed. Since the second low-side switch LS2 is coupled to VBAT instead of ground and in order to achieve the same voltage across C (in comparison to the embodiment in FIG. 2), the output level VOUT of the boost converter 4 needs to be increased. The new and increased level VOUT_NEW is preferably equal to VOUT+VBAT.

After charge balancing, the first node A of the H-bridge 6 is at a level VOUT_NEW1 and the second node B of the H-bridge 6 is at the potential VBAT. For discharging the load capacitance C, the high-side switches HS1, HS2 as well as the low-side switches LS1, LS2 are opened. The first node A of the H-bridge 6 is the node having the highest potential, namely VOUT_NEW1. Accordingly, the first and second diode D1, D2 will allow a complete discharge of the load capacitance C. Charge is supplied to the boost converter 4 until the first node A of the H-bridge 6 reaches the level of the power input node VIN, namely VBAT.

Figure 4:
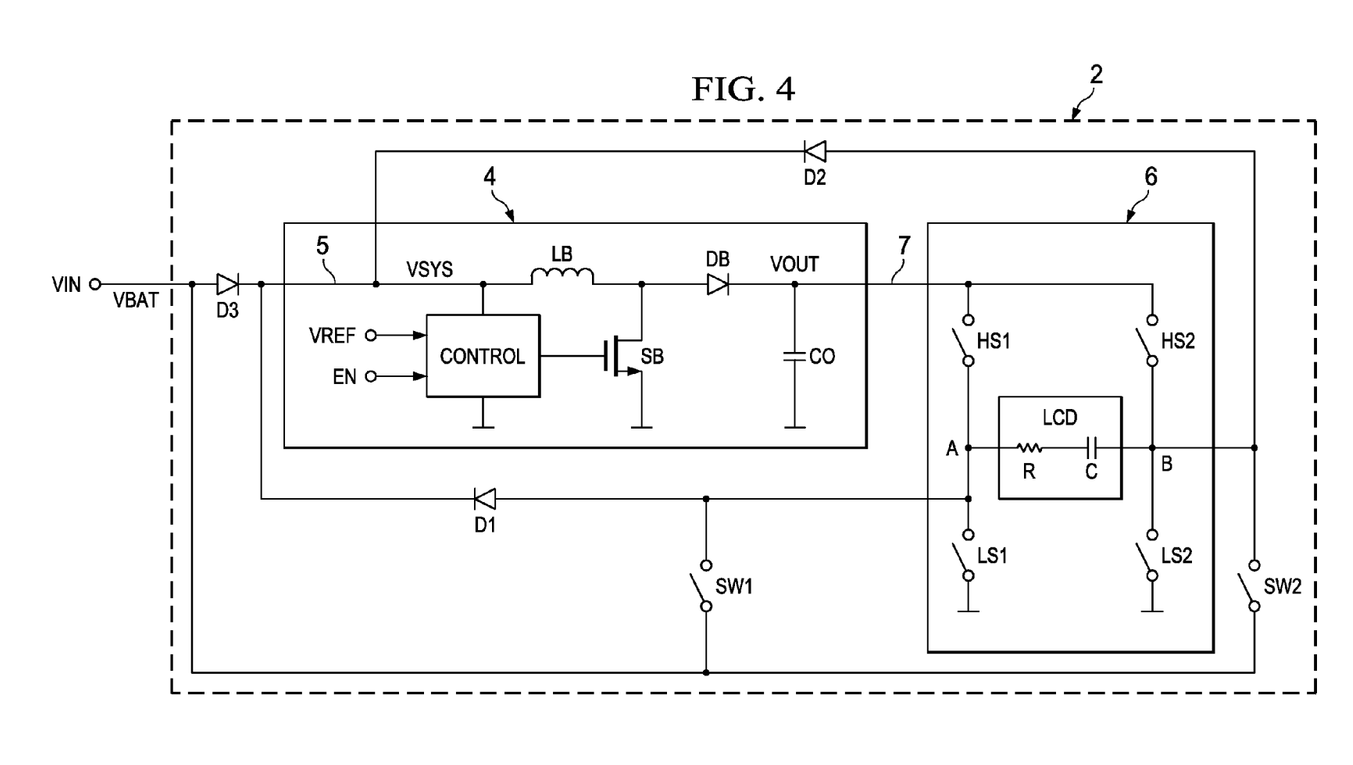

FIG. 4 is another simplified circuit diagram for a power supply unit 2 according to a further embodiment of the invention. The power supply unit of FIG. 4 is based on the power supply unit known from FIG. 2; however, a first switch SW1 is coupled between the power input node VIN and the first node A of the H-bridge 6 and further, a second switch SW2 is coupled between the power input node VIN and the second node B of the H-bridge 6. The remaining parts of the power supply unit 2 in FIG. 4 comply with the power supply unit in FIG. 2.

After a charging phase and subsequent charge balancing, the first node A of the H-bridge 6 is at a voltage level VOUT1.

During a discharge phase, both high-side switches HS1 and HS2 and the two low-side switches LS1 and LS2 of the H-bridge 6 are opened. The second switch SW2; however, is closed and, accordingly, the second node B of the H-bridge 6 is shifted to the voltage level of the power input node VIN, namely to the voltage VBAT. Accordingly, the first node A of the H-bridge 6 is at a potential of VOUT1+VBAT. Now, during the discharge phase, the first diode D1 and the third diode D3 will allow a complete discharge of the load capacitance C, i.e., the load capacitance C will discharge until the first node A of the H-bridge 6 reaches approximately the level VBAT of the power input node VIN.

After this discharge/recovery period, a reverse charging of the load capacitance C may be started. Accordingly, the second high-side switch HS2 and the first low-side switch LS1 of the H-bridge 6 may be closed. Again, a charge balancing between the output capacitor CO and the load capacitor C will take place. After the balancing, the second node B of the H-bridge 6 is at VOUT1. During a subsequent or next discharge/recovery period, again the two high-side switches HS1 and HS2 and the two low-side switches LS1 and LS2 are opened and the first switch SW1 is closed. Accordingly, the first node A of the H-bridge 6 is shifted to the level VBAT of the power input node VIN. Accordingly, the second node B of the H-bridge 6 is at VOUT1+VBAT and is the node having the highest potential. Accordingly, the second diode D2 and the third diode D3 allow a complete discharge of the load capacitance C via the diode D2. After the complete discharge of the capacitance C, power is supplied to the boost converter 4 via the power input node VIN.

Figure 5:
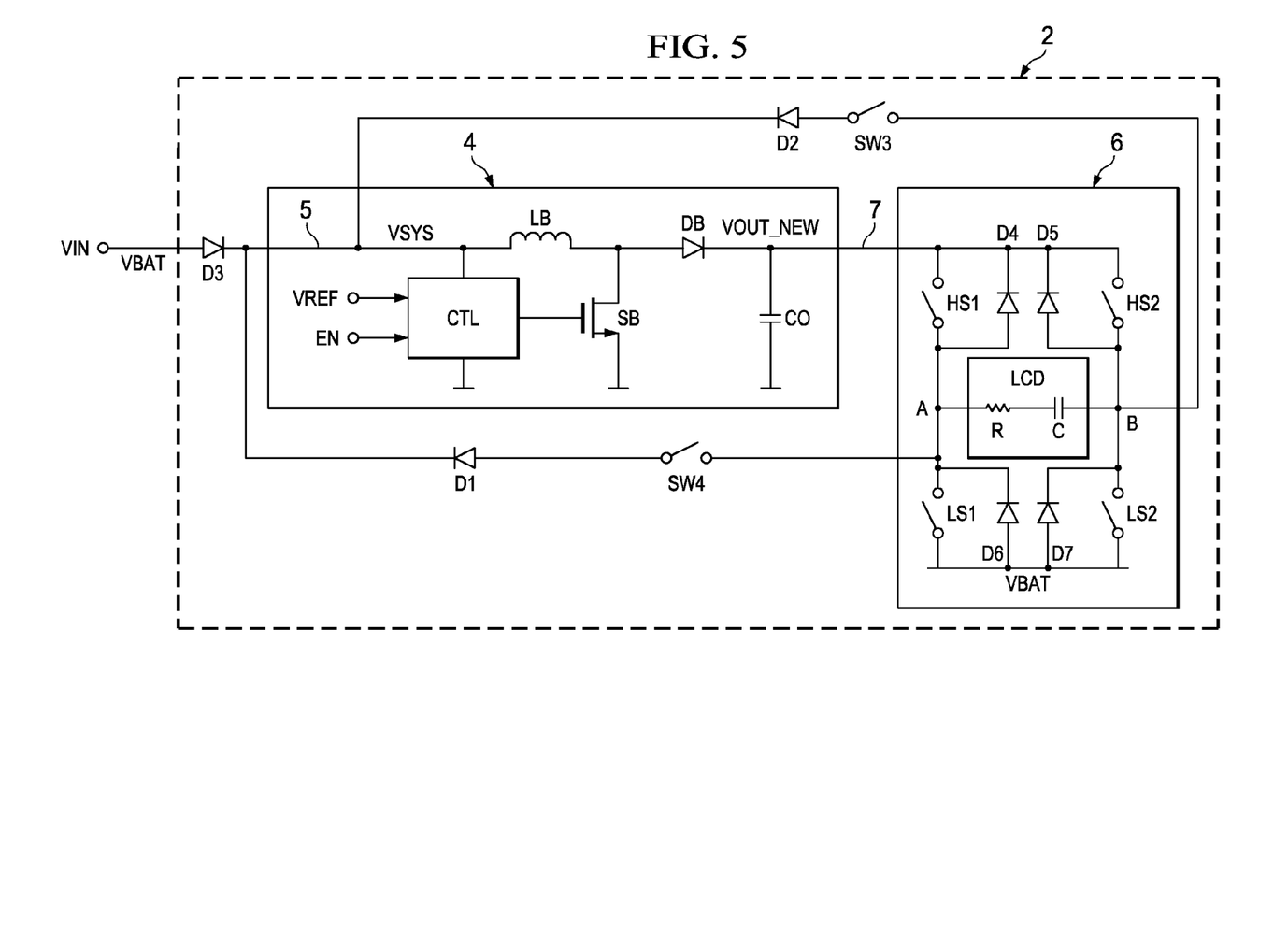

FIG. 5 is another simplified circuit diagram of a power supply unit 2 according to an embodiment of the invention. The embodiment corresponds to the embodiment in FIG. 3; however a third switch SW3 is coupled between the second node B of the H-bridge 6 and the input line 5 of the boost converter 4. A further additional switch, namely a fourth switch SW4, is coupled between the first node A of the H-bridge 6 and the input line 5 of the boost converter 4. The remaining elements of the embodiment in FIG. 5 correspond to the embodiment in FIG. 3.

For the embodiments in FIGS. 2 to 4, it is preferable that the boost converter 4 is switched ON during the discharge phases of the load capacitance C only. In order to avoid this requirement, the further switches SW3 and SW4 are integrated in the power supply unit 2 according to the embodiment in FIG. 5. This is especially preferred, if the boost converter 4 is shared among a plurality of H-bridges 6.

For charging the load capacitance C to an exemplary first load state, the first high-side switch HS1 and the second low-side switch LS2 of the H-bridge 6 is closed. Subsequently, a charge balancing takes place. During the charge phase, the third switch SW3 and the fourth switch SW4 are open. The H-bridge 6 is then decoupled from the input line 5 of the boost converter 4 that may remain switched ON.

In a subsequent discharge/recovery phase, the second low-side switch LS2 is closed and accordingly the second node B of the H-bridge 6 is raised to the level VBAT. Accordingly, the first node A of the H-bridge 6 assumes a level of VOUT1 (which is the result of the charge balancing between CO and C) plus VBAT (i.e., VOUT1+VBAT). By closing the fourth switch SW4, the charge of the load capacitor C may be completely recovered.

During a reverse charging of the load capacitance C, the second high-side switch HS2 and the first low-side switch LS1 are closed. Again, the third switch SW3 and the fourth switch SW4 are open during this phase and the H-bridge is decoupled from the input of the boost converter 4. For recovering the charge of the load capacitance C, the first low-side switch LS1 is closed and consequently the first node A of the H-bridge 6 assumes the level VBAT. The second node B of the H-bridge 6 assumes a level of VOUT_NEW1+VBAT. For discharging the load capacitance C, the third switch SW3 is closed. The charge of the load capacitance C may be completely recovered due to the presence of the second diode D2 and the third diode D3. The charge is recovered from the load capacitor C until the level of the second node B of the H-bridge 6 assumes a level that is below that of the power input node VIN.

Figure 6:
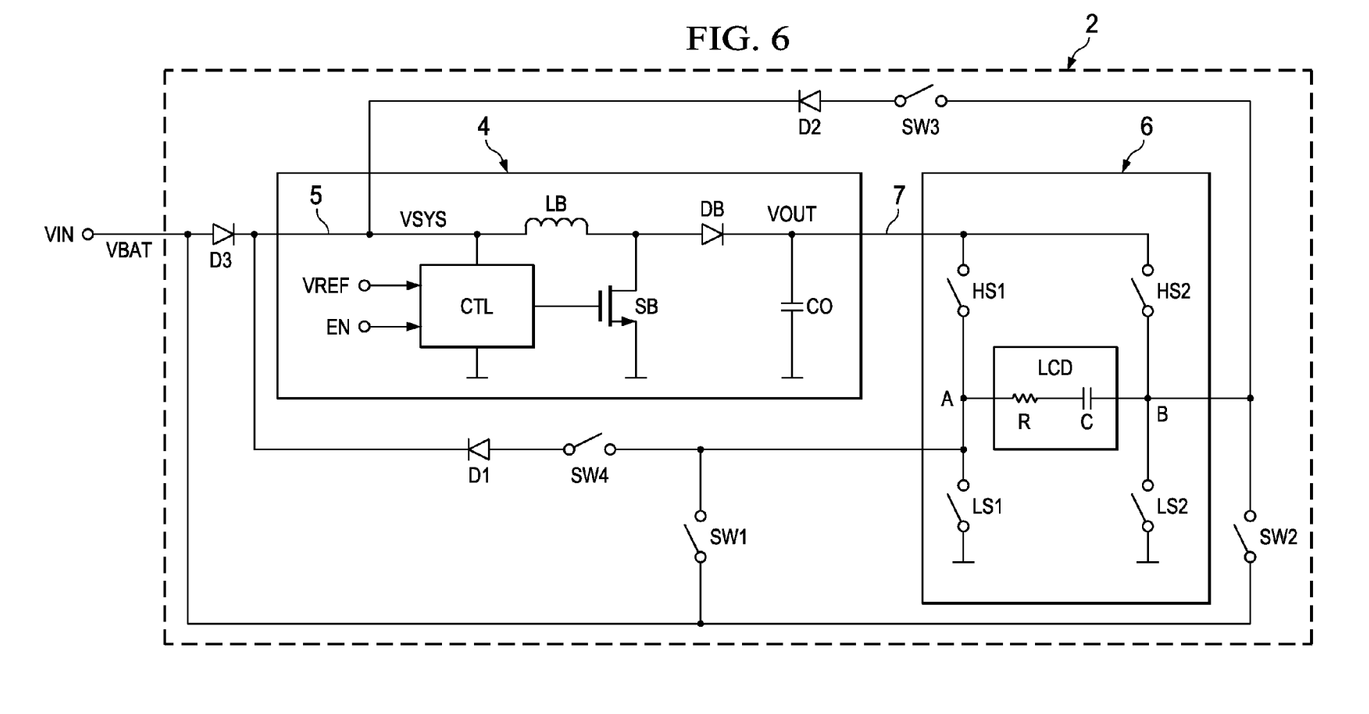

FIG. 6 is a further simplified circuit diagram for a power supply unit 2 according to another embodiment of the invention. The embodiment is a combination of the embodiment in FIGS. 4 and 5. In comparison to the embodiment of FIG. 5, the further switches, namely the first switch SW1 and the second switch SW2 that have been already mentioned with respect to FIG. 4 have been added. The further parts of the power supply unit 2 according to the embodiment in FIG. 6 have been already mentioned with respect to FIG. 4. While the power supply unit 2 according to the embodiment in FIG. 5 necessarily needs an increased output voltage (i.e., VOUT_NEW), in order to overcome the VBAT level to which the first and second low-side switches (LS1, LS2) are connected instead of ground, the power supply unit 2 according to the embodiment in FIG. 6 solely needs the lower output voltage VOUT. The output voltage of the boost converter 4 directly corresponds to the voltage across the load capacitance C.

For charging the load capacitance C to an example first load state, the first high-side switch HS1 and the second low-side switch LS2 are closed. The third switch SW3 and the fourth switch SW4 are opened or remain open during the charge phase. During the discharge phase, the high-side switches (HS1, HS2) and the low-side switches (LS1, LS2) of the H-bridge 6 are opened or remain open. The second switch SW2 is closed and therefore the second node B of the H-bridge 6 is set to the voltage level VBAT of the power input node VIN. Accordingly, the first node A of the H-bridge 6 assumes a potential of VOUT1+VBAT. Again, VOUT1 is the result of the balancing between CO and C. The fourth switch SW4 is closed and therefore the first diode D1 and the third diode D3 allow a complete discharge of the load capacitance C.

For a reverse charging of the load capacitance C, the second switch SW2 and the fourth switch SW4 are opened and the second high-side switch HS2 and the first low-side switch LS1 are closed. Now, the second node B of the H-bridge 6 assumes the voltage level VOUT1. For discharging the load capacitance C, all switches of the H-bridge (HS1, HS2, LS1, LS2) are opened. The first switch SW1 is closed and the first node A of the H-bridge 6 is set to VBAT. Accordingly, the second node B of the H-bridge 6 assumes a level VOUT1+VBAT. Subsequently, the third switch SW3 is closed and the second diode D2 and the third diode D3 allow a complete discharge of the load capacitance C to the boost converter 4.

Figure 7:
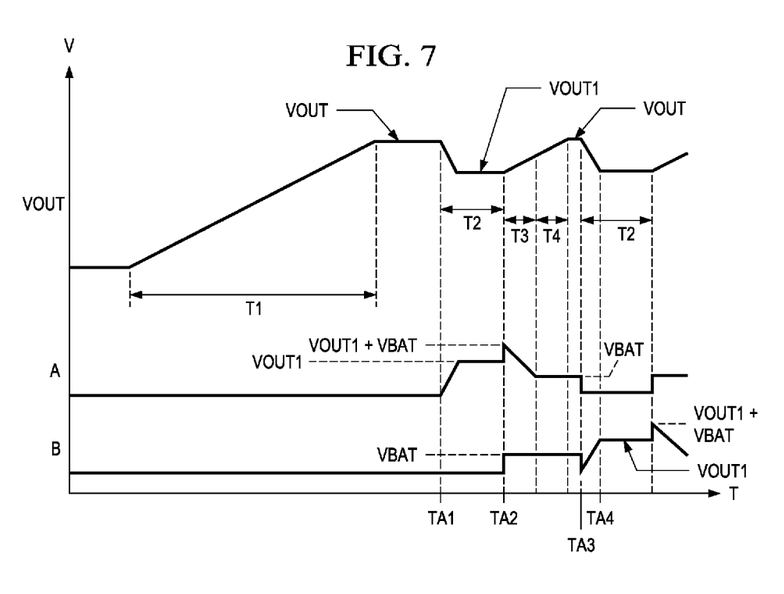
FIG. 7 is a timing diagram showing time-dependent voltage curves at selected nodes of a power supply unit according to an embodiment of the invention.

FIG. 7 is an example of a timing diagram for the embodiment in FIG. 4. The output voltage of the boost converter VOUT, the voltage level at the first node A of the H-bridge 6 and the voltage level at the second node B of the H-bridge 6 are illustrated as time-dependent voltage signals. During a first period T1, the output capacitor CO of the boost converter 4 is charged to a supply voltage VOUT, e.g., VOUT=12 V. During charging the output capacitor CO, the first high-side switch HS1 and the second high-side switch HS2 of the H-bridge 6 are open. At a first point in time TA1; for example, the first high-side switch HS1 and the second low-side switch LS2 are closed. Accordingly, the first node A of the H-bridge 6 assumes a voltage VOUT1 that is the result of the charge balancing between the load capacitor C and the output capacitor CO. The boost converter 4 is switched OFF during this charging phase, and accordingly, the output voltage at the boost converter 4 shows a slight drop to the voltage VOUT1. Now, the LCD may remain in a first switching state, wherein the period T2 is the time span for the balancing plus the time the LCD remains in the first switching state.

At a second point in time TA2, the discharging process starts and the boost converter is switched ON, e.g., by setting the enabling signal EN for the control unit CTL to HIGH. The second switch SW2 in the embodiment of FIG. 4 is closed, and accordingly, the second node B of the H-bridge 6 is set to VBAT. Consequently, the level of the first node A of the H-bridge 6 is raised by the amount of VBAT to the sum potential of VOUT1+VBAT. During the period T3, the load capacitance C is completely discharged and charge is supplied via the diode D1 to the input line 5 of the boost converter 4 and further to the output capacitor CO. At the end of period T3, the first node A of the H-bridge 6 assumes the level of VBAT. In a subsequent period T4, power is supplied to the boost converter 4 via the power input node VIN, e.g., from a battery. After expiration of period T4, the power output node 7, again, assumed the desired output voltage VOUT. Before charging the load capacitance C to a second charge state, i.e., a reverse charge state, the second switch SW2 is opened and the second high-side switch HS2 and the first low-side switch LS1 is closed. Accordingly, the second node B of the H-bridge 6 drops to ground potential at the point in time TA3. Between TA3 and TA4 a charge balancing between the load capacitor CO and the load capacitance C takes place. Accordingly, the second node B of the H-bridge 6 assumes the balancing voltage VOUT1. Again, period T2 indicates the balancing time plus a time the LCD remains in a second switching state. For discharging the load capacitance C, all high-side and low-side switches HS1, HS2, LS1, LS2 are opened while the first switch SW1 is closed. Accordingly, the first node A of the H-bridge 6 is raised to the level VBAT. Consequently, the second node B of the H-bridge 6 assumes a potential of VOUT1+VBAT. Now, as already mentioned for the reverse discharging, the load capacitance C is completely discharged via the diode D2 and charge is provided to the boost converter 4.

The power supply units, according to the embodiments of the invention, provide significant power savings as became clear from exemplary simulations. For an exemplary LCD having a resistance of 4.5 Ohm and a capacitance of 100 nF the power supply unit 2 according to the prior art (FIG. 1) consumes 2.817 mA from the power supply node VIN, e.g., from a battery. In contrast, the power supply unit 2 according to the embodiment in FIG. 2 consumes 1.9947 mA for switching the same example LCD. Further power savings may be achieved using the power supply unit 2, according to the embodiment in FIG. 4, having an average power consumption of 1.5448 mA.

Although the invention has been described in detail, it should be understood that various changes, substitutions and alterations, may be made thereto without departing from the spirit or scope of the invention as defined by the appended claims.

The invention claimed is:

1. A power supply unit comprising:
a boost-converter having an input node and an output node;
the output node being coupled to a high-side of an H-bridge for supplying power to a capacitive load that is coupled to a first node and to a second node of the H-bridge;
wherein a first diode is coupled in forward direction between the first node of the H-bridge and the input node of the boost-converter and wherein a second diode is coupled in forward direction between the second node of the H-bridge and the input node of the boost-converter; further comprising a first switch and a second switch, wherein the first switch is coupled between a power input node of the power supply unit and the first node of the H-bridge and the second switch is coupled between the power input node of the power supply unit and the second node of the H-bridge.

2. The power supply unit according to claim 1, wherein a third diode is coupled in forward direction between a power source and the input node of the boost-converter.

3. The power supply unit according to claim 1, wherein a low-side of the H-bridge is coupled to a power supply node.

4. The power supply unit according to claim 1, further comprising a third switch and a fourth switch, wherein the third switch is coupled between the second node of the H-bridge and the input node of the boost converter and the fourth switch is coupled between the first node of the H-bridge and the input node of the boost converter.

5. The power supply unit according to claim 1 wherein the capacitive load is an LCD display.

6. The power supply unit according to claim 1 wherein the H-bridge comprises four MOS transistors, each transistor comprising a body diode.

7. The power supply unit according to claim 1 wherein the H-bridge comprises four MOS transistors, each transistor comprising a body diode.

8. A method for operating a power supply unit comprising a boost-converter having an input node and an output node, the output node being coupled to a high-side of an H-bridge for supplying power to a capacitive load that is coupled to a first node and to a second node of the H-bridge, wherein a first diode is coupled in forward direction between the first node of the H-bridge and the input node of the boost-converter and a second diode is coupled in forward direction between the second node of the H-bridge and the input node of the boost-converter, the power supply unit further comprising a first switch and a second switch, wherein the first switch is coupled between the power input node and the first node of the H-bridge and the second switch is coupled between the power input node and the second node of the H-bridge, the method comprising the steps of:
charging the capacitive load to a first load state by closing a first high-side switch of the H-bridge and by closing a second low-side switch of the H-bridge; and
discharging the capacitive load by closing the second switch only.

9. The method according to claim 8, wherein the boost-converter is activated during the step of discharging only.

10. The method according to claim 8, further comprising the steps of:
charging the capacitive load to a second load state by closing a second high-side switch of the H-bridge and by closing a first low-side switch of the H-bridge;
wherein in its second load state, the capacitive load is oppositely charged compared to the first load state; and
discharging the capacitive load by closing the first switch only.

11. The method according to claim 8 wherein the capacitive load coupled to the H-bridge is an LCD display.

12. The method according to claim 8, further comprising coupling a third diode in a forward direction between the power source and the input node of the boost-converter.

* * * * *